United States Patent
Kim et al.

(10) Patent No.: US 7,835,575 B2
(45) Date of Patent: Nov. 16, 2010

(54) APPARATUS AND METHOD FOR CONVERTING PREFERENCE COLOR

(75) Inventors: Se-eun Kim, Suwon-si (KR); Byoung-ho Kang, Yongin-si (KR); Heui-keun Choh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1038 days.

(21) Appl. No.: 11/595,938

(22) Filed: Nov. 13, 2006

(65) Prior Publication Data

US 2007/0139439 A1 Jun. 21, 2007

(30) Foreign Application Priority Data

Dec. 12, 2005 (KR) ...................... 10-2005-0121836

(51) Int. Cl.
*G06K 9/00* (2006.01)
*G09G 5/02* (2006.01)
*G03F 3/08* (2006.01)

(52) U.S. Cl. ...................................... 382/167; 345/604

(58) Field of Classification Search ................. 382/162, 382/164, 165, 167, 173, 190, 199, 272, 283; 345/589, 591, 593, 600–604; 358/515, 518, 358/523, 525, 530, 538; 348/97, E9.037, 348/E9.055

See application file for complete search history.

(56) References Cited

U.S. PATENT DOCUMENTS

| | | | | | |
|---|---|---|---|---|---|
| 4,962,540 | A | * | 10/1990 | Tsujiuchi et al. | 382/165 |
| 5,210,600 | A | * | 5/1993 | Hirata | 358/527 |
| 5,497,431 | A | * | 3/1996 | Nakamura | 382/162 |
| 5,610,732 | A | * | 3/1997 | Komatsu | 358/525 |
| 5,874,988 | A | * | 2/1999 | Gu | 348/97 |
| 6,167,167 | A | * | 12/2000 | Matsugu et al. | 382/283 |
| 6,323,969 | B1 | * | 11/2001 | Shimizu et al. | 358/523 |
| 6,356,274 | B1 | * | 3/2002 | Spector | 345/589 |
| 6,816,611 | B1 | * | 11/2004 | Hagiwara et al. | 382/165 |
| 7,046,865 | B2 | * | 5/2006 | Kasutani | 382/305 |
| 7,251,056 | B2 | * | 7/2007 | Matsushima | 358/1.9 |
| 7,305,124 | B2 | * | 12/2007 | Zhao et al. | 382/164 |

(Continued)

FOREIGN PATENT DOCUMENTS

JP  06-169395 A  6/1994

(Continued)

*Primary Examiner*—Amir Alavi
(74) *Attorney, Agent, or Firm*—Sughrue Mion, PLLC

(57) ABSTRACT

An apparatus and method are provided for converting a preference color, in which the color space of a preference color selected by a user is divided into a plurality of sub-regions according to color distribution characteristics, and the colors of the respective regions of an input image corresponding to the user's preference color are converted into colors of proper sub-regions among the plurality of sub-regions. The apparatus for converting a preference color includes an image extraction unit which extracts at least one image region that includes a preference color from an input image, an image analysis unit which analyzes color distribution characteristics of the image region, a color-space extraction unit which extracts a divided space corresponding to the color distribution characteristics from divided spaces included in a color space of the preference color, and a color conversion unit which converts a color of the image region by using a color conversion model corresponding to the extracted divided space.

20 Claims, 6 Drawing Sheets

U.S. PATENT DOCUMENTS

| | | | |
|---|---|---|---|
| 7,327,875 B2 * | 2/2008 | Sawada | 382/162 |
| 2007/0139439 A1 * | 6/2007 | Kim et al. | 345/604 |
| 2007/0211272 A1 * | 9/2007 | Kang et al. | 358/1.9 |

FOREIGN PATENT DOCUMENTS

| | | |
|---|---|---|
| JP | 09-163164 A | 6/1997 |
| JP | 2001-092956 A | 4/2001 |
| JP | 2001-251531 A | 9/2001 |
| JP | 2003-125226 A | 4/2003 |
| JP | 2004-180114 A | 6/2004 |
| JP | 2004-192614 A | 7/2004 |
| JP | 2004-297698 A | 10/2004 |
| KR | 10-2005-0015107 A | 2/2005 |

* cited by examiner

| MAIN POINT | FIRST DIVIDED-SPACE | | | SECOND DIVIDED-SPACE | | | THIRD DIVIDED-SPACE | | |
|---|---|---|---|---|---|---|---|---|---|
| | L* | a* | b* | L* | a* | b* | L* | a* | b* |
| FIRST MAIN POINT | 100 | 0 | 0 | 100 | 0 | 0 | 73.6 | 0 | 0 |
| SECOND MAIN POINT | 97.5 | 16.8 | 26.6 | 84.2 | 26.4 | 28.1 | 55.2 | 33.5 | 53.1 |
| THIRD MAIN POINT | 84.2 | 26.8 | 42.5 | 55.2 | 16.8 | 26.6 | 13.5 | 10.1 | 15.9 |
| FOURTH MAIN POINT | 55.2 | 26 | 13.7 | 35.0 | 16.8 | 26.6 | 26.6 | 9.8 | 5.1 |

APPARATUS AND METHOD FOR CONVERTING PREFERENCE COLOR

CROSS-REFERENCE TO RELATED APPLICATION

This application is based on and claims priority from Korean Patent Application No. 10-2005-0121836, filed on Dec. 12, 2005 in the Korean Intellectual Property Office, the disclosure of which is incorporated herein in its entirety by reference.

BACKGROUND OF THE INVENTION

1. Field of the invention

Apparatuses and methods consistent with the present invention relate to converting a preference color and, more particularly, to converting a preference color by dividing the color space of a preference color selected by a user into a plurality of sub-regions according to color distribution characteristics, and converting the colors of the respective regions of an input image corresponding to the user's preference color into colors of proper sub-regions among the plurality of sub-regions.

2. Description of the Related Art

Digital imaging devices that reproduce colors, such as monitors, scanners, and printers, have diverse functions and high quality that meet various user requirements. Also, the digital imaging devices use different color spaces or different color models depending on their respective fields of use. Examples of the color models include a device dependent color model and a device independent color model. The device dependent color model includes an RGB color model corresponding to an additive color space model and a CMYK color model corresponding to a subtractive color space model. The device independent color model includes a CIE LAB model, a CIE XYZ model, and a CIE LUV model.

The CIE LAB model quantifies colors defined by the Commission Internationale de l'Eclairage on color space coordinates, and expresses the colors as numerical values of an L* (lightness), a* (red-green), and b* (yellow-blue) series. The CIE XYZ model represents RGB tristimulus values as XYZ, which is a set of other tristimulus values having positive signs. The CMYK color model is used in the field of printing, while the RGB color model is used in the field of computer monitor displays, such as Internet graphics.

The digital imaging device may output colors of an input image as they are, or convert specified colors among colors of an input image and output the converted colors of the input image. Accordingly, a user can view an image with the converted colors that are more natural.

General users' preference colors may include a skin color, a blue-sky color, and a green grass color. A related color conversion algorithm performs color conversion based on a single region that includes a user's preference color if the corresponding region is included in an input image.

That is, if two regions including a skin color that is a user's preference color exist in an image, the conventional color conversion algorithm performs a uniform color conversion on colors of the two corresponding regions.

As described above, the conventional algorithm can perform the uniform color conversion on the corresponding regions, but cannot perform color conversion in consideration of the color distribution characteristics of the respective regions.

Accordingly, a method that can perform color conversion by regions of an image in consideration of the color distribution characteristics of the respective regions is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for converting a preference color, which divides the color space of a preference color selected by a user into a plurality of sub-regions according to color distribution characteristics, and converts the colors of the respective regions of an input image corresponding to the user's preference color into colors of proper sub-regions among the plurality of sub-regions.

According to an aspect of the present invention, there is provided an apparatus for converting a preference color, which includes an image extraction unit which extracts at least one image region that includes a user's preference color from an input image, an image analysis unit which analyzes color distribution characteristics of the image region, a color-space extraction unit which extracts a divided space corresponding to the color distribution characteristics from divided spaces included in a color space of the preference color, and a color conversion unit which converts a color of the image region by using a color conversion model corresponding to the extracted divided space.

In another aspect of the present invention, there is provided a method of converting a preference color, which includes extracting at least one image region that includes a user's preference color from an input image, analyzing color distribution characteristics of the image region, extracting a divided space corresponding to the color distribution characteristics from divided spaces included in a color space of the preference color, and converting a color of the image region by using a color conversion model corresponding to the extracted divided space.

BRIEF DESCRIPTION OF THE DRAWINGS

The above and other aspects of the present invention will become more apparent from the following detailed description of exemplary embodiments taken in conjunction with the accompanying drawings, in which.

Figure 1:
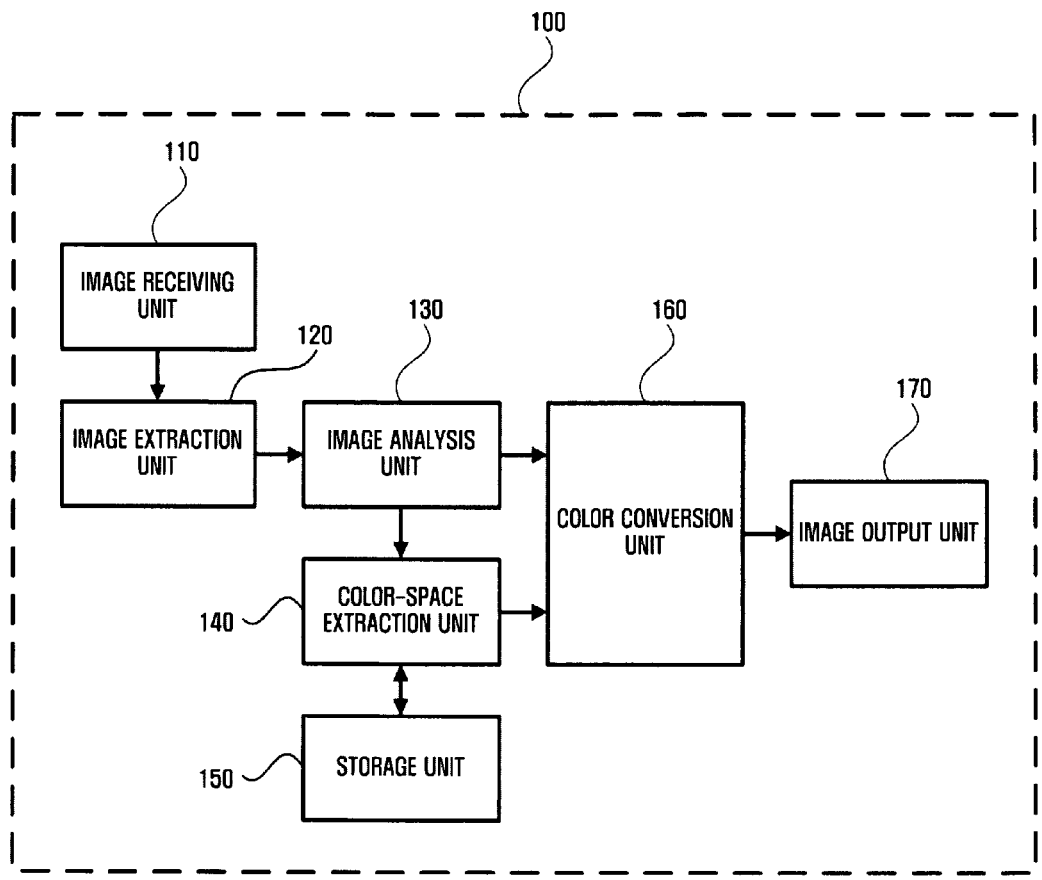
FIG. 1 is a block diagram illustrating the construction of an apparatus for converting a preference color according to an exemplary embodiment of the present invention.

DETAILED DESCRIPTION OF EXEMPLARY
EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims and their legal equivalents. In the entire description of the present invention, the same drawing reference numerals are used for the same elements across various figures.

Exemplary embodiments of the present invention will be described herein with reference to the accompanying drawings illustrating block diagrams and flowcharts for explaining an apparatus and method for converting a preference color. Each block of the flowcharts, and combinations of blocks in the flowcharts, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce instruction means that implement the function specified in the flowchart block or blocks.

The computer program instructions may also be loaded onto a computer or other programmable data processing apparatus to cause a series of operational steps to be performed on the computer or other programmable apparatus, in order to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may be executed substantially concurrently, or in reverse order, depending upon the functionality involved.

FIG. 1 is a block diagram illustrating an apparatus for converting a preference color according to an exemplary embodiment of the present invention. Referring to FIG. 1, a color conversion apparatus 100 includes an image receiving unit 110, an image extraction unit 120, an image analysis unit 130, a color-space extraction unit 140, a storage unit 150, a color conversion unit 160, and an image output unit 170.

The image receiving unit 110 receives an image. Here, the received image may be an analog image or a digital image, and the image receiving unit 110 may convert a received analog image into a digital image.

If the color model of the received image is an RGB (Red, Green, Blue) color model, which is an additive color space model, the image receiving unit 110 can convert it into a CIE LAB color model, which is a uniform color space model, and particularly, can convert it into a CIE LCH (Lightness, Chroma, Hue) color model. Accordingly, the image extraction unit 120 can receive an image of the LCH color model from the image receiving unit 110.

Here, the LCH color model is a color model composed of lightness, chroma, and hue, and the respective constituent elements may be indicated as $L^*$, $C^*$, and $h^*$.

The image extraction unit 120 extracts at least one image region that includes a user's preference color from the image transferred from the image receiving unit 110.

Here, the preference color is a color sensitively reacted to or preferred by a user, and includes a skin color, a sky-blue color, and a green grass color. With supplement of the preference color only, the user can feel that he/she views an image of a high picture quality.

In the present invention, however, the preference color is not limited to the skin color, sky-blue color, and green grass color, and any other color may be set by a user as his/her preference color.

The image extraction unit 120 can separately extract image regions for a plurality of preference colors. In the case where two or more objects having the same preference color exist in an image, being apart from each other over a predetermined distance, the image extraction unit 120 may separately extract the corresponding image regions. An inherent identification number may be given to the extracted image region, and different identification numbers may be given not only to image regions having different preference colors, but also to image regions having the same preference color, depending on their arrangements.

The extracted image regions are transferred to the image analysis unit 130, and the image analysis unit 130 analyzes the color distribution characteristics of the transferred image regions. The color distribution characteristics include averages and standard deviations of the color space of the pixels included in the image region. Here, a CIE LAB color space, CIE XYZ color space, or CIE LUV color space can be used as the color space.

In addition, the image analysis unit 130 converts the lightness of the whole pixels included in an image into a preset reference size, and then analyzes the average and standard deviation of the transferred image region. This makes it possible to smoothly perform the extraction of the color space through the color-space extraction unit 140, which will be explained later.

The color-space extraction unit 140 extracts a divided space that correspond to the color distribution characteristics of the image region among divided spaces included in the color space of the preference color.

Figure 4:
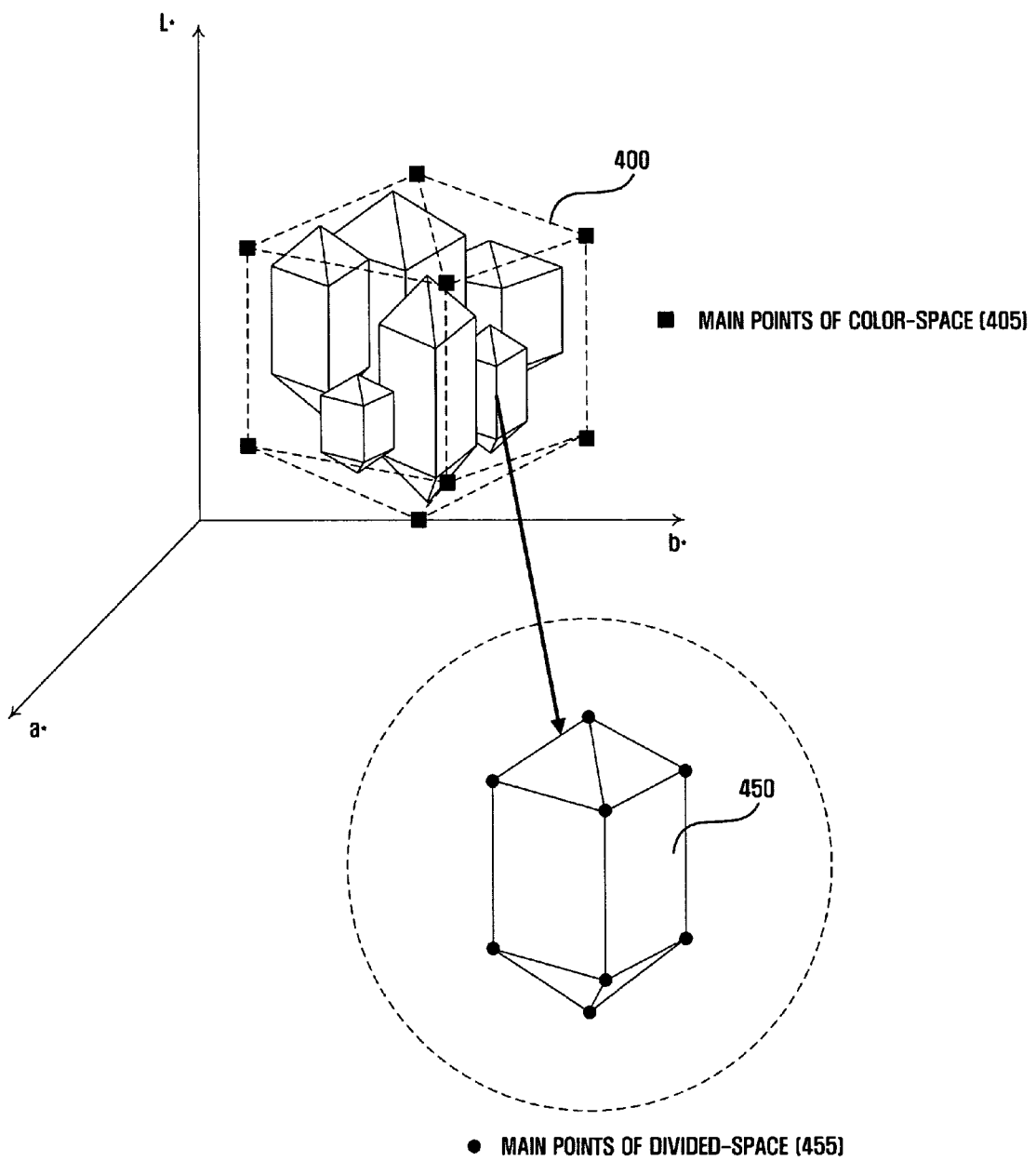
FIG. 4 is a view illustrating a color space according to an exemplary embodiment of the present invention.
Figures 5, 6:
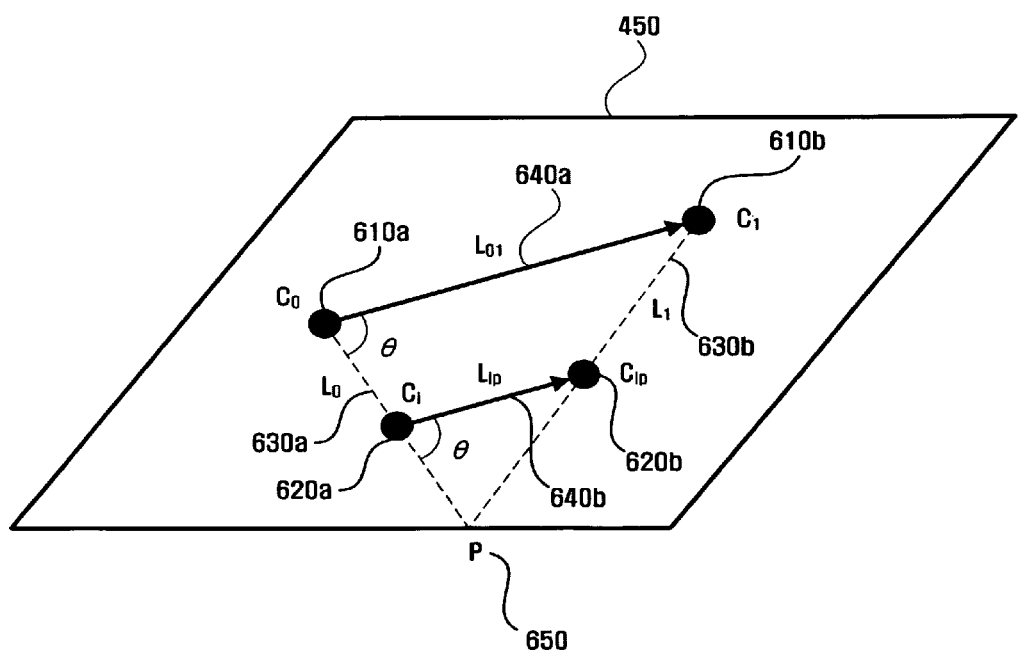
FIG. 5 is a view illustrating a color distribution table according to an exemplary embodiment of the present invention.
FIG. 6 is a view illustrating conversion of colors in an image region in accordance with a color conversion model according to an exemplary embodiment of the present invention.

As illustrated in FIG. 4, a color space 400 of a specified preference color may be divided into a plurality of divided spaces, and the respective divided space 450 can be expressed in a color distribution table 500 as shown in FIG. 5.

Once the color distribution characteristics of the image regions, i.e., an average and standard deviation of the image region, are transferred from the image analysis unit 130, the color-space extraction unit 140 confirms an overlapping region between the color space 400 formed according to the color distribution characteristics and the divided spaces 450. At this time, by substituting values of colors of respective points that form the external shape of the divided space 450 in the color distribution characteristics of the image region, the overlapping region can be judged.

The color-space extraction unit 140 extracts a divided space having the largest overlapping part among the divided spaces 450, and transfers the extracted divided space 450 to the color conversion unit 160.

A color distribution table 500 that the color-space extraction unit 140 refers to in order to extract the divided space 450 may be stored in the storage unit 150. This storage unit 150, which is a module that can input/output information such as a hard disk, a flash memory, a compact flash card (CF card), a secure digital card (SD card), a smart media card (SM card), a multimedia card (MMC), and a memory stick, may be provided inside the color conversion apparatus 100 or in a separate apparatus.

The color conversion unit 160 converts the colors of the respective image regions extracted by the image extraction unit 120 by using a color conversion model corresponding to the color space 400 extracted by the color-space extraction unit 140. Here, the color space 400 may be a divided space 450 extracted by the color-space extraction unit 140.

For example, if the image region extracted by the image extraction unit 120 refers to a skin color, the color-space extraction unit 140 extracts an optimum divided space 450 that most nearly corresponds to the corresponding image region among the divided spaces 450 included in the color space 400 of the skin color, and the color conversion unit converts the color of the corresponding image region in accordance with the color conversion model corresponding to an optimum divided space.

The color conversion in the image region, which is performed by the color conversion unit 160, is applied to all pixels included in the transferred image region, and the color conversion unit 160 converts the color of the pixels with the adjustment of the size of the color conversion included in the color conversion model in proportion to the color of the pixels included in the image region.

A detailed explanation on the color conversion according to the conversion rate will be made later with reference to FIG. 6.

The image output unit 170 outputs the image region converted by the color conversion unit 160. The image output unit 170 may be a module with an image display means, such as a cathode ray tube (CRT), a liquid crystal display (LCD), a light-emitting diode (LED), an organic light-emitting diode (OLED), and a plasma display panel (PDP), to display the transferred image region; or a module provided with an image printing means, such as a printer, to print the transferred image region. The image output unit 170 may be provided inside the color conversion apparatus 100 or in a separate apparatus.

Figure 2:
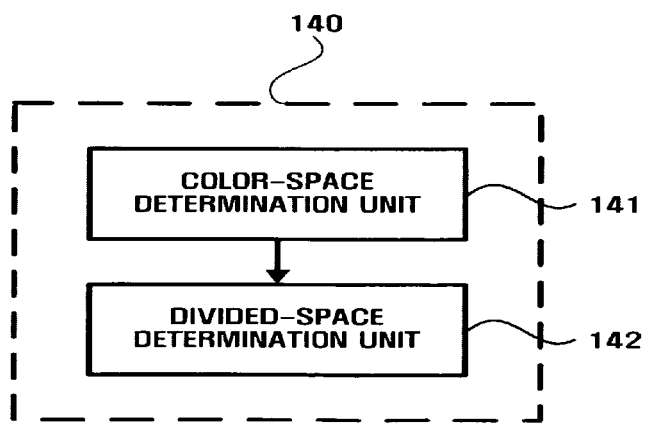
FIG. 2 is a block diagram illustrating the construction of a color-space extraction unit according to an exemplary embodiment of the present invention.

FIG. 2 is a block diagram illustrating the construction of a color-space extraction unit according to an exemplary embodiment of the present invention.

In order to extract the divided space 450 corresponding to the color distribution characteristics of the extracted image region, the color-space extraction unit 140 may include a color-space determination unit 141 and a divided-space determination unit 142.

The color-space determination unit 141 determines an optimum color space 400 that most nearly includes the color distribution characteristics of the extracted image region among the color spaces 400 determined according to the preference color. Here, the color-space determination unit 141 determines the color space 400 that most nearly overlaps the color distribution characteristics by substituting values of respective points that form the external shape of the color space 400 in the color distribution characteristics of the extracted image region. For this, the color-space determination unit 141 uses an average and standard deviation of colors of pixels included in the image region. That is, the color-space determination unit 141 substitutes values of main points 405 that form the color space 400 in the color distribution characteristics, and determines an optimum color space 400 using probability values calculated as a result of substitution.

The divided-space determination unit 142 determines an optimum divided space 450 that corresponds to the color distribution characteristics among a plurality of divided spaces 450 included in the optimum color space. Here, the divided-space determination unit 142 determines the divided space 450 that most nearly overlaps the color distribution characteristics by substituting values of respective points that form the external shapes of divided spaces 450 in the color distribution characteristics of the extracted image region. For this, the divided-space determination unit 142 uses an average and standard deviation of colors of pixels included in the image region. That is, the divided-space determination unit 142 substitutes values of main points 455 that form the divided space 450 in the color distribution characteristics, and determines an optimum divided space 450 using probability values calculated as a result of substitution.

Figure 3:
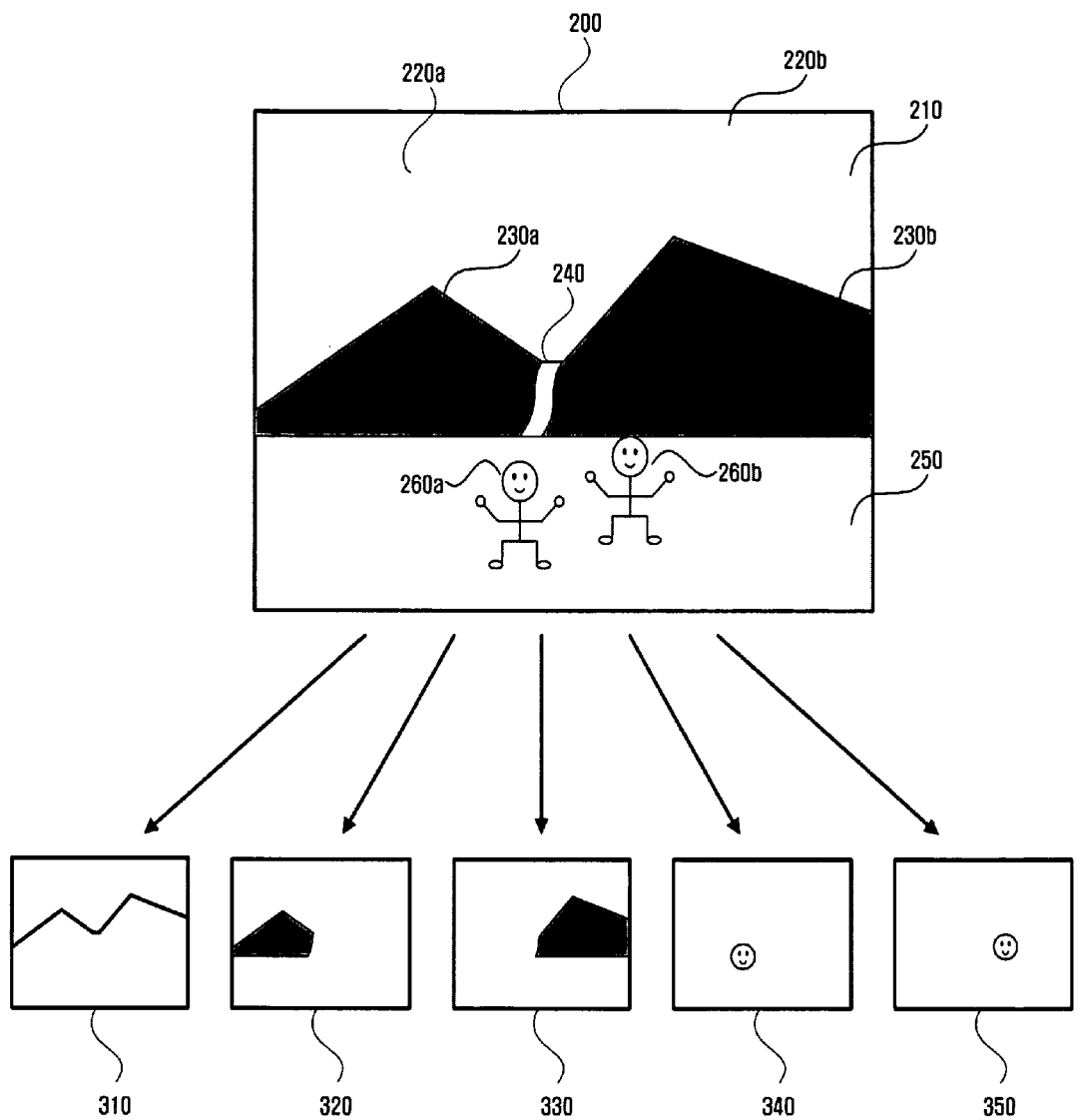
FIG. 3 is a conceptual view illustrating extraction of image regions according to an exemplary embodiment of the present invention.

FIG. 3 is a conceptual view illustrating extraction of image regions according to an exemplary embodiment of the present invention. FIG. 3 shows that image regions 310, 320, 330, 340, and 350 are extracted from an input image 200 according to preference colors by the image extraction unit 120.

As described above, the image extraction unit 120 can separately extract image regions for a plurality of preference colors. In the case where two or more objects having the same preference color exist in an image 200, and are apart from each other over a predetermined distance, the image extraction unit 120 may separately extract the corresponding image regions.

The image 200 of FIG. 3 includes the sky 210, clouds 220a and 220b, mountains 230a and 230b, a river 240, the ground 250, and human beings 260a and 260b. Here, if it is assumed that the preference colors set by a user are a skin color, a sky-blue color, and a green grass color, the sky 210 including the sky-blue color occupies one region in the input image, and the human beings 260a and 260b including the skin color occupy two regions at a specified distance. Also, the mountains 230a and 230b including the green grass color occupy two regions at a specified distance (corresponding to the width of the river).

Accordingly, the image extraction unit 120 can extract one image region 310 including the sky-blue color, two image regions 320 and 330 including the green grass color, and two image regions 340 and 350 including the skin color. That is, if image regions including the same preference color, such as the mountains 230a and 230b or the human beings 260a and 260b, are apart from each other over a predetermined distance, the image extraction unit 120 extracts the image regions 320, 330, 340, and 350 separately.

The colors of the extracted image regions are converted by the color conversion unit 160 according to the color conversion model of the extracted divided spaces 450, and thus the color conversion apparatus 100 can perform a closer color conversion on the input image 200.

FIG. 4 is a view illustrating a color space according to an exemplary embodiment of the present invention. As shown in FIG. 4, the color space 400 is composed of a plurality of divided spaces 450.

Respective color spaces 400 may exist according to a user's preference colors. If the color space 400 according to the preference color is composed of one color space, it is impossible to perform a closer color conversion on the input image, and thus the color conversion apparatus 100 according to the present invention performs the color conversion using the color space 400 divided into a plurality of divided spaces 450.

That is, the color-space extraction unit 140 extracts the divided space 450 that most nearly overlaps the corresponding image region in the color space 400 corresponding to the preference color of the input image region, and the color conversion unit 160 converts the color of the corresponding image region using the color conversion model that corresponds to the divided space 450 extracted by the color-space extraction unit 140.

The color space 400 of FIG. 4 is a color space drawn according to the CIE LAB color space, and the color space 400 may be in accord with the CIE XYZ color space or the CIE LUV color space, depending on the user's selection.

In addition, when color spaces 400 according to the CIE LAB color space, CIE XYZ color space, and CIE LUV color space have been defined, the color-space extraction unit 140 may extract the most overlapping divided space 450 by substituting the input image regions in the color spaces 400 included in all the defined color spaces.

For example, when the first image region and the second image region are inputted, color conversion may be performed on the first image region in accordance with the color conversion model that corresponds to the divided space 450 according to the CIE LAB color space, and color conversion may be performed on the second image region in accordance with the color conversion model that corresponds to the divided space 450 according to the CIE XYZ color space.

Although FIG. 4 shows a divided space 450 in the form of a dodecahedron of which the external shape is formed by 10 corner points, the divided space 450 may also be in a hexahedron form, a cylinder form, or any other 2-dimensional or 3-dimensional geometrical form.

The respective divided spaces may be arranged to overlap one another, and the number and color range of the divided spaces 450 may be set by a user.

The color-space extraction unit 140 extracts an optimum divided space 450 by substituting the divided space 450 in the color distribution characteristics of the image region transferred from the image analysis unit 130. In this case, the optimum divided space 450 can be extracted by substituting positions of main points 455 that form the divided space 450 in the color distribution characteristics. In other words, color information corresponding to the main points 455, e.g., values of CIE LAB, CIE XYZ, or CIE LUV, is substituted in the color distribution characteristics of the image region. Here, the main points 455 may be corner points that form the divided space 450 or separate points set by the user.

For this, color information of the main points 455 that form the divided space 450 may be stored in the form of a table by the storage unit 150.

FIG. 5 is a view illustrating a color distribution table according to an exemplary embodiment of the present invention. The color distribution table 500 may be separately constructed according to the preference colors, and may include color information 550 of the main points 455 that form the external shape of the divided space 450. For this, the color distribution table 500 includes a main-point field 510 and divided space fields 520, 530, and 540.

The color distribution table 500 is a table that includes the color information 550 defining the color space 400, and includes the color information 550 defining the shape of the divided space 450 included in the color space 400. In this case, the color information 550 may be color information on the main points 455 of the geometrical shape that forms the divided space 450. If the geometrical shape has corner points, such as a hexahedron or a dodecahedron, the corner points of the geometrical shape may correspond to the main points 455.

Here, the color information 550 may be CIE LAB, CIE XYZ, CIE LUV, and L*C*h values, or may be RGB values, depending on whether the color conversion apparatus 100 has been implemented.

The color distribution characteristics of the image region include the average and standard deviation, and the color-space extraction unit 140 substitutes the color information 550 of the main points 455 that correspond to the divided spaces 450 included in the color distribution table 500 in the color distribution characteristics of the image region, and calculates its probability values. Then, the color-space extraction unit 140 determines the divided space 450, in which the greatest probability value has been calculated, as an optimum divided space 450.

FIG. 6 is a view illustrating conversion of colors in an image region in accordance with a color conversion model according to an exemplary embodiment of the present invention. As shown in FIG. 6, colors of pixels included in the image region are converted in proportion to the distance between an initial point and an end point that is determined according to the color conversion model.

The color conversion model, which is to convert colors corresponding to the pixels of the image region included in the corresponding divided space 450, converts the colors corresponding to the pixels of the image region in proportion to the distance between the color information of the initial point and the color information of the end point.

FIG. 6 shows the conversion of the color of a specified pixel in the image region that is included in the divided space 450 extracted by the color-space extraction unit 140. Hereinafter, it is assumed that the initial point of the color conversion model is $C_0(610a)$, the end point is $C_1(610b)$, a point indicating a color of a specified pixel of an input image region is $C_i(620a)$, and a point indicating a color of a converted pixel is $C_{ip}(620b)$.

The color conversion unit 160 first forms a straight line $L_0(630a)$ that connects the initial point $C_0(610a)$ with the point $C_i(620a)$, and extracts a point P (650) at which the straight line $L_0(630a)$ intersects the external shape of the divided space 450. Then, the color conversion unit 160 forms a straight line $L_1(630b)$ that connects the point P (650) with the end point $C_1(610b)$, and forms a straight line $L_{01}(640a)$ that connects the initial point $C_0(610a)$ with the end point $C_1(610b)$.

Then, the color conversion unit 160 forms a straight line $L_{ip}(640b)$ that connects the point $C_i(620a)$ with a straight line $L_1(630b)$ at the same angle as that between the lines $L_{01}(640a)$ and $L_0(630a)$, and extracts a point $C_{ip}(620b)$ at which the straight line $L_1(630b)$ intersects the straight line $L_{ip}(640b)$.

The point $C_{ip}(620b)$ is a point that indicates a converted color with respect to the color of the pixel of the input image region, and consequently, it is determined in proportion to the distance between the points $C_0(610a)$ and $C_1(610b)$.

Here, the distance 640a between the points $C_0(610a)$ and $C_1(610b)$ calculated to determine the point $C_{ip}(620b)$, the distance 630a between the points P (650) and C₀(610a), the distance 630b between the points P (650) and C₁(610b), and the distance 640b between the points $C_i$(620a) and $C_{ip}$(620b) can be calculated by CIE delta E 2000.

The initial point C₀(610a) and the end point C₁(610b) are set differently by different color conversion models, and the user can set the initial point 610a and the end point 610b of the color conversion form intended by the user by color conversion models. The initial point 610a and the end point 610b set by color conversion models may be stored in the storage unit 150 in the form of a table, as shown in FIG. 7.

Figure 7:
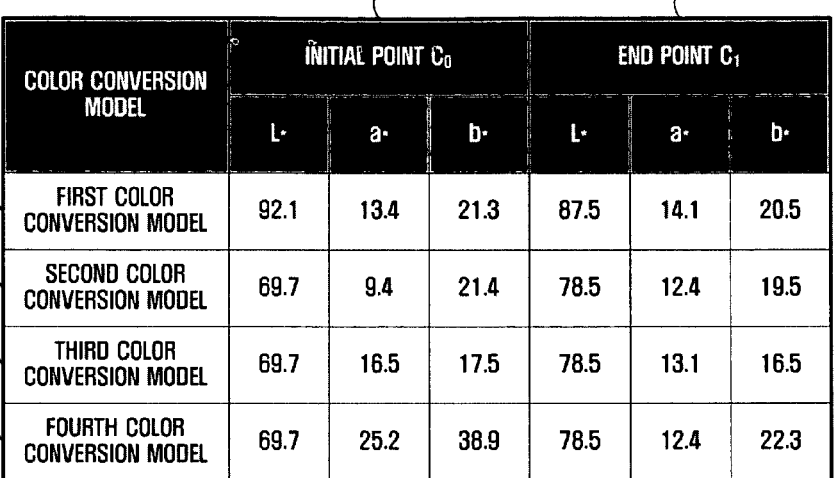
FIG. 7 is a view illustrating a color conversion table according to an exemplary embodiment of the present invention.

FIG. 7 is a view illustrating a color conversion table according to an exemplary embodiment of the present invention. The color conversion table 700 includes an initial point 710 and an end point 720 according to the color space defined by CIE LAB color model by color conversion models 750a, 750b, 750c, 750d, and 750e.

In the CIE LAB color model, L* denotes lightness, a* denotes a combination of red and green, and b* denotes a combination of yellow and blue. A user can generate a desired color conversion model by setting L*, a*, and b* values of the initial point 710 and the end point 720 according to the color conversion model. That is, the user can generate the color conversion model by modifying lightness or specified colors.

In FIG. 7, the value of L* of the end point of the first color-conversion model 750a is somewhat less than the value of L* of the initial point, and the values of a* and b* of the end point are similar to the values of a* and b* of the initial point. This decrease of L* causes a decrease of lightness. Also, the values of L* and a* of the end point of the second conversion model 750b are somewhat greater than the value of L* and a*, respectively, of the initial point, and the value of b* of the end point is somewhat less than the value of b* of the initial point. This increase of L* and a*causes a decrease of yellow.

As described above, the user can set the lightness and the colors of the initial point and the end point when generating the color conversion model for converting the colors of the image region. In order to increase lightness and decrease red, the user can set the values of the initial point and the end point according to the third color-conversion model 750c, while in order to increase lightness and decrease chroma, the user can set the values of the initial point and the end point according to the fourth color-conversion model 750d. Also, in order to increase lightness, the user can set the values of the initial point and the end point according to the fifth color-conversion model 750e.

FIG. 7 illustrates the use of CIE LAB as the color model of the initial point and the end point. However, a CIE XYZ or CIE LUV color model can also be used instead.

Figure 8:
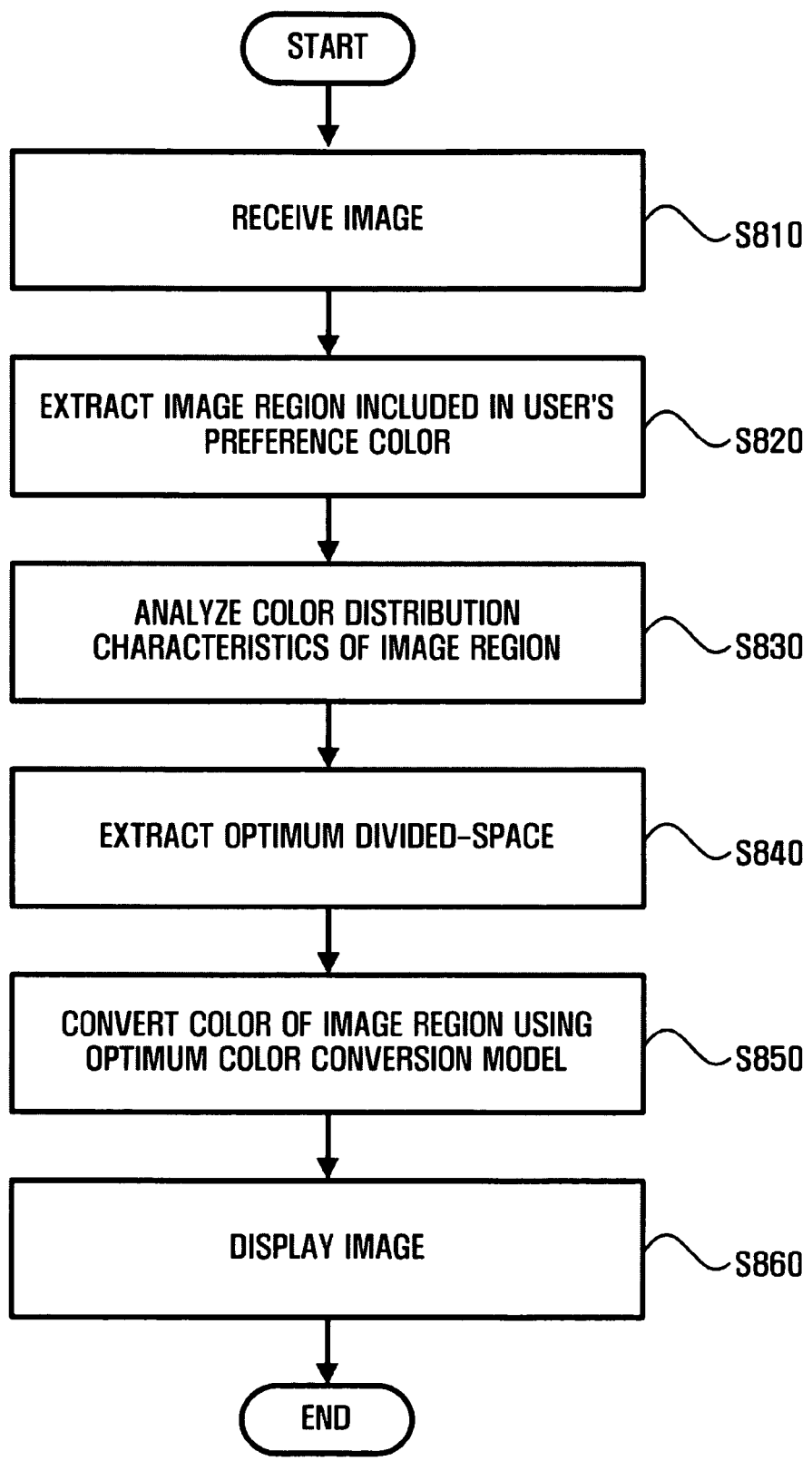
FIG. 8 is a flowchart illustrating a process of converting a preference color according to an exemplary embodiment of the present invention.

FIG. 8 is a flowchart illustrating a process of converting a preference color according to an exemplary embodiment of the present invention.

In order to convert the preference colors set by the user and included in an image, the image receiving unit 110 of the color conversion apparatus 100 receives the image (S810). The color model of the received image may be an RGB color model or CMYK color model, and the image receiving unit 110 can convert the received image into a CIE LAB color model or a CIE LCH color model.

Accordingly, the image of the LCH color model is transferred to the image extraction unit 120, and the image extraction unit 120 extracts at least one image region included in the user's preference colors in the image transferred from the image receiving unit 110 (S820). The preference colors may include a skin color, a sky-blue color, and a green grass color, or other colors may be set as the user's preference colors.

The image extraction unit 120 can perform the extraction of an image region according to the preference colors, and the extraction of an image region according to the arrangement of the image region. That is, when a plurality of regions having the same preference color exists, the image extraction unit 120 extracts one image region, considering the plurality of regions as the same region, if the plurality of regions are closely arranged, while the image extraction unit 120 extracts a plurality of regions separately if the plurality of regions are arranged to be apart from each other over a predetermined distance.

The extracted image regions are transferred to the image analysis unit 130, and the image analysis unit 130 analyzes the color distribution characteristics of the transferred image regions (S830). The color distribution characteristics include averages and standard deviations of the color spaces of pixels included in the image regions. Here, the color space may be a CIE LAB color space, a CIE XYZ color space, or a CIE LUV color space.

In order to make the color-space extraction unit 140 smoothly extract the color space 400, the image analysis unit 130 may convert the lightness of the whole pixels included in the image into a preset reference size, and then analyze the average and standard deviation of the color space with respect to the image regions.

The image analysis unit 130 transfers the analyzed color distribution characteristics to the color-space extraction unit 140, and transfers the image received from the image receiving unit 110 to the color conversion unit 160.

The color-space extraction unit 140 extracts the divided space 450 that corresponds to the color distribution characteristics of the image region among the divided spaces 450 included in the color space 400 of the preference color (S840).

For this, the color-space extraction unit 140 determines the optimum color space 400 that most nearly includes the color distribution characteristics of the image region in the color space 400, and then determines the optimum divided space 450 that corresponds to the color distribution characteristics among the plurality of divided spaces 450 included in the determined optimum color space 400.

In order to determine the optimum color space 400 and the optimum divided space 450, the color-space extraction unit 140 uses the average and the standard deviation of the colors of the pixels included in the image region. That is, the color-space extraction unit 140 substitutes the values of the main points 455 that form the divided space 450 in the color distribution characteristics, and extracts the optimum divided space 450 by using the probability value calculated as a result of substitution.

The color conversion model that corresponds to the divided space 450 extracted by the color-space extraction unit 140 is transferred to the color conversion unit 160, and the color conversion unit 160 converts the color of the image region transferred from the image analysis unit 130 by using the color conversion model transferred from the color-space extraction unit 140 (S850). That is, the color conversion unit 160 converts the color of the pixels by proportionally adjusting the size of the color conversion included in the color conversion model in accordance with the color of the pixels included in the image region.

The color-converted image regions are combined with other image regions not extracted by the image extraction unit 120 to be provided as a converted image, and the image output unit 170 outputs the color-converted image (S860).

As described above, the apparatus and method for converting a preference color according to exemplary embodiments of the present invention has one or more of the following effects.

A color space of a preference color selected by a user is divided into a plurality of sub-regions according to color distribution characteristics, and colors of the respective regions of an input image corresponding to the user's preference color are converted into colors of proper sub-regions among the plurality of sub-regions. Accordingly, the respective regions included in the preference color can be expressed in consideration of the colors of neighboring images.

Exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. An apparatus for converting a preference color, the apparatus comprising:
    an image extraction unit which extracts a plurality of image regions that include a preference color from an input image;
    an image analysis unit which analyzes color distribution characteristics of each of the plurality of image regions;
    a color-space extraction unit which extracts a divided space corresponding to the color distribution characteristics of each of the plurality of image regions from a plurality of divided spaces included in a color space of the preference color; and
    a color conversion unit which converts a color of each of the plurality of image regions by using a color conversion model corresponding to the divided space which is extracted.

2. The apparatus of claim 1, wherein the preference color comprises at least one of a skin color, a blue color, and a green color.

3. The apparatus of claim 1, wherein the preference color is selected by a user.

4. The apparatus of claim 1, wherein the color distribution characteristics comprise an average and a standard deviation of colors of pixels included in each of the plurality of image regions.

5. The apparatus of claim 4, wherein the image analysis unit analyzes the average and the standard deviation after lightness of whole pixels included in the image is converted into a reference size.

6. The apparatus of claim 1, wherein the color space is one of a CIE LAB color space, a CIE XYZ color space, and a CIE LUV color space.

7. The apparatus of claim 1, wherein the color-space extraction unit comprises:
    a color-space determination unit which determines an optimum color space that most nearly includes the color distribution characteristics among color spaces; and
    a divided-space determination unit which determines an optimum divided space that most nearly includes the color distribution characteristics among a plurality of divided spaces included in the optimum color space.

8. The apparatus of claim 7, wherein the color-space determination unit determines the optimum color space using an average and a standard deviation of colors of pixels included in each of the plurality of image regions.

9. The apparatus of claim 7, wherein the divided-space determination unit determines the optimum divided space using an average and standard deviation of colors of pixels included in each of the plurality of image regions.

10. The apparatus of claim 1, wherein the color conversion unit converts colors of pixels by adjusting a size of color conversion included in the color conversion model in proportion to the colors of the pixels included in each of the plurality of image regions.

11. A method of converting a preference color, the method comprising:
    extracting a plurality of image regions that include a preference color from an input image;
    analyzing color distribution characteristics of each of the plurality of image regions;
    extracting a divided space corresponding to the color distribution characteristics of each the plurality of image regions from divided spaces included in a color space of the preference color; and
    converting a color of each of the plurality of image regions by using a color conversion model corresponding to the divided space which is extracted.

12. The method of claim 11, wherein the preference color comprises at least one of a skin color, a blue color, and a green color.

13. The method of claim 11, wherein the preference color is selected by a user.

14. The method of claim 11, wherein the color distribution characteristics comprise an average and a standard deviation of colors of pixels included in each of the plurality of image regions.

15. The method of claim 14, wherein the analyzing the color distribution characteristics of the image region comprises analyzing the average and the standard deviation after lightness of whole pixels included in the image is converted into a preset reference size.

16. The method of claim 11, wherein the color space is one of a CIE LAB color space, a CIE XYZ color space, and a CIE LUV color space.

17. The method of claim 11, wherein the extracting the divided space comprises:
    determining an optimum color space that most nearly includes the color distribution characteristics among color spaces; and
    determining an optimum divided space that most nearly includes the color distribution characteristics among a plurality of divided spaces included in the optimum color space.

18. The method of claim 17, wherein the determining the optimum color space comprises determining the optimum color space using an average and a standard deviation of colors of pixels included in each of the plurality of image regions.

19. The method of claim 17, wherein the determining the optimum divided space comprises determining the optimum divided space using an average and a standard deviation of colors of pixels included in each of the plurality of image regions.

20. The method of claim 11, wherein the converting the color of the image region comprises converting colors of pixels by adjusting a size of color conversion included in the color conversion model in proportion to the colors of the pixels included in each of the plurality of image regions.

* * * * *